United States Patent
Mashinsky et al.

(10) Patent No.: US 9,090,170 B2
(45) Date of Patent: Jul. 28, 2015

(54) SELF-CHARGING ELECTRIC VEHICLE AND AIRCRAFT AND WIRELESS ENERGY DISTRIBUTION SYSTEM

(71) Applicants: Alex Mashinsky, Memphis, TN (US); David Mashinsky, Memphis, TN (US); Rena Mashinsky, Memphis, TN (US)

(72) Inventors: Alex Mashinsky, Memphis, TN (US); David Mashinsky, Memphis, TN (US); Rena Mashinsky, Memphis, TN (US)

( * ) Notice: Subject to any disclaimer, the term of this patent is extended or adjusted under 35 U.S.C. 154(b) by 0 days.

(21) Appl. No.: 14/217,252

(22) Filed: Mar. 17, 2014

(65) Prior Publication Data

US 2014/0197787 A1 Jul. 17, 2014

Related U.S. Application Data

(63) Continuation-in-part of application No. 12/679,060, filed on Mar. 19, 2010, now Pat. No. 8,890,472, which is a continuation-in-part of application No. 12/229,706, filed on Aug. 26, 2008.

(60) Provisional application No. 61/798,240, filed on Mar. 15, 2013.

(51) Int. Cl.
*H02J 7/00* (2006.01)
*H02J 7/14* (2006.01)
*B60L 11/18* (2006.01)

(52) U.S. Cl.
CPC ............. *B60L 11/182* (2013.01); *B60L 11/185* (2013.01); *B60L 11/1842* (2013.01); *B60L 11/1846* (2013.01); *B60L 2230/22* (2013.01); *B60L 2230/24* (2013.01); *B60L 2230/30* (2013.01); *B60L 2230/32* (2013.01); *Y02E 60/721* (2013.01); *Y02T 10/7005* (2013.01); *Y02T 10/7088* (2013.01); *Y02T 90/121* (2013.01); *Y02T 90/122* (2013.01); *Y02T 90/128* (2013.01); *Y02T 90/14* (2013.01); *Y02T 90/169* (2013.01); *Y04S 10/126* (2013.01); *Y04S 30/14* (2013.01)

(58) Field of Classification Search
USPC .................. 320/104, 108, 109, 137; 180/2.1; 191/10; 318/16; 307/104
See application file for complete search history.

(56) References Cited

U.S. PATENT DOCUMENTS

| | | | | |
|---|---|---|---|---|
| 5,998,963 | A * | 12/1999 | Aarseth .......................... | 320/109 |
| 6,094,028 | A * | 7/2000 | Gu et al. ........................ | 320/109 |
| 6,792,259 | B1 * | 9/2004 | Parise .......................... | 455/343.1 |
| 7,602,143 | B2 * | 10/2009 | Capizzo ........................ | 320/109 |
| 8,008,888 | B2 * | 8/2011 | Oyobe et al. .................. | 320/108 |
| 2001/0012208 | A1 * | 8/2001 | Boys .............................. | 363/23 |
| 2007/0182367 | A1 * | 8/2007 | Partovi .......................... | 320/108 |
| 2008/0111518 | A1 * | 5/2008 | Toya .............................. | 320/108 |

* cited by examiner

*Primary Examiner* — Edward Tso
*Assistant Examiner* — Alexis A Boateng
(74) *Attorney, Agent, or Firm* — Barnes & Thornburg LLP; Thomas J. McWilliams; Edward F. Behm, Jr.

(57) ABSTRACT

A system and method to provide fast charge and discharge of electrical power without wires between two elements configured to have resonant tuned coils and circuits. The coils are energized by a power source that includes super capacitors, fast charging batteries and oscillating power management system.

27 Claims, 3 Drawing Sheets

SELF-CHARGING ELECTRIC VEHICLE AND AIRCRAFT AND WIRELESS ENERGY DISTRIBUTION SYSTEM

RELATED APPLICATIONS

This application claims priority from U.S. Provisional Patent Application Ser. No. 61/798,240 filed on Mar. 15, 2013, and is a continuation-in-part of U.S. patent application Ser. No. 12/679,060 filed on Mar. 19, 2010, and is a continuation-in-part of U.S. patent application Ser. No. 12/229,706, filed on Aug. 26, 2008, all of which are incorporated herein by reference in their entirety.

BACKGROUND OF THE INVENTION

Millions of electrical vehicles and other electric transportation systems are coming to market which require constant charging. All such devices have large slow charging batteries and other storage devices of electrical charge which need to be plugged in to DC or AC power sources to be recharged. For some of these a slow charge of several hours is required to complete charge the slow-charging NiMH or Li-ion or Led acid batteries. For many consumer devices and Electrical Vehicles (EV) the size, weight and cost of the large battery is a major design and cost problem which prevents the company producing the devices or cars from achieving the optimal design and performance characteristics they would like.

Most design solutions provide for either a very large battery which can provide for range of over 100 miles or an on board engine which uses fossil fuels to recharge such batteries. The added cost makes EV more expensive than gasoline cars and require high maintenance for both motors.

Since most batteries are made from rare earth metals a shortage of such elements and high prices require a solution that will enable billions of people to own EV or use electrical public transport options without the industry running out of such resources.

Currently Electrical Vehicles (EV) require a plug-in solution with a dedicated high voltage and amperage alternating current (AC) outlet with expensive rectifiers in order to provide the device with proper conditioned DC electrical charge to fill out the DC batteries. While many attempts are known in the art for wireless charging all such innovations require very small gap of no more than few inches or touch between the transmitting coil and receiving coils to transfer power from the source to a device and they do not solve the issue of rapid transfer of vast amounts of energy or the automated configuration, security, authentication and conditioning of the power to the specific device which needs the charge.

Other system provide for removable EV battery solutions or induction based continuous charge which needs the EV to be very close or touching the road or charge track.

SUMMARY OF THE INVENTION

What is desired is a charging system without wires and related infrastructure which can enable fast AC transfer and fast DC charging at a high rate of energy transfer for electric vehicles and other transport applications and efficient communications via said charging system between all the system elements. Such a system will require a combination of processor and semiconductors controlled dynamic high voltage power modulation with the use of high voltage MOSFETS and other ceramic based components as well as super capacitors or ultra capacitors which can operate at very fast cycles and pulsed high voltage and DC power applications. The system can work in conjunction with power line communications (PLC) to transmit modulated data transmission on the same resonant oscillating power coils which can be received, extracted and interpreted by the corresponding PLC receiver on the secondary coil. Such two way communications can be used by the inventive system to combine power and data communications for a variety of purposes inside and outside the vehicle.

The invention combines several previously known and less known components to provide for a system and a method to enable ultra fast AC & DC charge and discharge cycles in the wireless section of the system combined with slow DC charge and discharge cycles to be used in the Electrical Vehicle battery and the grid connected rectifier and storage section and other industry infrastructure to support such invention.

The present invention enables fast top off charges to be done during EV transport or during short stops at multiple locations which allows for EV vehicles to have full range with much smaller batteries in the EV and in EV public transport systems. This new configuration drastically reduces the cost of such vehicles making them more affordable and available to the general public. This invention also combines multiple forms of storage and batteries and power such as alternating current (AC) and direct current (DC) in a single system with different frequencies and modulations as well as different storage materials and components for each stage of the power collection from the local grid, AC or DC sources. Resonant tuned shaped alternating or pulsed magnetic fields enable efficient wireless transfer, tuned transmission and receiving coils as well as passive tuned coils and elements designed for optimal reception, tuning, tunneling and absorption of EMF into AC and multi stage electrical storage on board the EV to maximize and optimize the speed and volume of energy transferred. Different type of batteries and capacitors can be combined into structures to provide better protection for the encasement and safety of the entire EV storage solution. For example the outside of the battery may be made of nano tubes and configured to act as a super capacitor connected to the inside batteries and take advantage of the strength of the nano material casing to contain many smaller batteries made of more volatile materials such as Lithium.

Such configuration can be designed to be placed inside vehicles or buildings or at strategic locations around the electric grid to provide safe and safety code compliant access to store and retrieve power for a variety of purposes.

This invention for the first time provides the ability to transmit sufficient power to continuously operate EV and other transport systems without the need for long charge cycles that are plugged by cable in to charge station.

An EV with a combination of one or multiple transmit/receive tuned coils wrapped inside and around ferrite reflectors or other material to maximize the shaping of the electric and magnetic fields (EMF) and connected to power management systems (PMS) which manage the AC/DC conversion, communicate and manage the speed and intensity of the electrical collection, storage and flow between a series of interconnected super or ultra capacitors, fast charging capacity storage devices or batteries and slow charging high capacity batteries can perform very high speed charge or discharge of such electrical storage, thereby replacing the traditional single step NIMH or Li-ion batteries which have limited charge discharge cycles, speed and capabilities. The high frequency high voltage oscillating or pulsed power transmission which generates induction in the coils can be quickly generated and transmitted by MOSFET or other solid state semiconductors which are controlled by the Primary PMS. The EMF may then be extended by one or multiple passive coils and then absorbed by the receiving coils which are connected via a secondary EV PMS to supercaps capable of accepting, rectifying, inverting and retaining such charge. The EV PMS then manages the continuous transfer and distribution of the energy flow between all the different systems connected to the PMS including the high speed charging batteries (HSCB) to allow for superfast top off charging while the car is moving over such coils and shaped magnetic fields or when it is at a traffic light, stop sign or at a resting stop, parking spot or intersection. If the stop is for longer than a few seconds the Charging unit power management system can start transferring large quantities of charge and if necessary re-condition the power into DC or different voltages and amperage to send it to the slow charging batteries based on their unique specifications and condition. Since each of such components operates optimally at different voltages, amperage, frequency and capacitance it is critical to optimize such systems by direct communication between the Charging unit PMS and EV PMS. The initiation and authentication of the communication can be made from either PMS which then handles the combining and managing the accumulation and transfer of such electrical charge in the most optimal way between the flash transfer, short term and long term storage systems. As these components and storage systems go through thousands of charge/discharge cycles and age (decay), their performance levels changes at different rates, and the PMS software adjusts the transfer rates and frequencies to adjust to optimize the life cycle and performance of such components and systems. As parts are replaced the PMS senses the change in transfer and absorption/charge levels and reconfigures the transmission parameters as needed.

The goal of such design and inventive systems is to absorb as much electrical charge as possible with the least amount of time and lowest energy losses while providing safe and effective transfer of high frequency power between at least two resonant and tuned coils. As described in FIG. 1 such transmission system can be connected to standard 110-480V, 50 Hz-5 MHz power sources and outlets and have a solid state or transformer based processor based power management systems (PMS) which changes the low voltage low frequency power source into high voltage high frequency modulated wave, pulsed bursts or other oscillating cycle which is fed into the transmitting coils. The charging unit may have a combination of capacitors and batteries in one or multiple stages so it can take slow charge from the relatively low voltage Grid or power source outlets and charge up to capacity over a prolonged period but then provide rapid discharge into the coil to maximize the EV charge in the shortest period of time. Such configuration dramatically reduces the cost of charging stations which traditionally require special multi-phase power sources, high voltage and amperage and special installation and have slowed down the adoption of EV in many countries. The charging station can have a combination of plug in and wireless charging which may include multiple active and passive coils to accommodate small and large EV and other systems including devices and electrical power instruments. Each station can provide wireless, visual and electronic indication of its charge state and ability to accommodate one or multiple EVs. A user can see state and charge levels of their systems and the charging stations on their EV dashboard or on their mobile device or see green light on the charging station or EV to know that his EV or bus or train can be charged or is charged in full in several seconds.

Tuned resonating coils perform best at different frequencies and voltages than traditional induction based systems. Based on the selection of materials, oscillating or pulsed power sources and size and distance of the coils and surrounding ferrite metals, a tuned resonant frequency and voltage as well as amperage can be established dynamically by the receiving and transmitting PMS. Such communication can be a combination of both the feedback generated by the PMS system as well as the communication sent and received from the other PMS which is transmitting or receiving power.

Such PMS determines the parameters of the transmission based on identification and communications provided by the EV or other apparatus which has the receiving coil.

Both systems must match many parameters in order for efficient and rapid transfer of energy to take place. Each EV may have different size coils, different PMS and different storage systems. The system design is for the charging unit station PMS to be able to sense or communicate with such EV PMS and tune the charging station's transmit/receive functions to optimize the power transfer with each such coupling.

The transmitting Coils and PMS system is capable of providing very high oscillations, handle very high voltage and amperage and handle DC and AC inputs as to accommodate all types of charging EV and other elements.

When the transmitting coil is energized it emits directional EMF which is then absorbed by the receiving coil, such receiving coil is connected to a similar PMS which then conditions the incoming electric energy to be best absorbed by the storage systems on the EV or system these may include the electric motors, capacitors, batteries and other systems that run on electricity. Since different EV and system may have different configurations of batteries, capacitors and other storage elements such as hydrogen fuel cells or magnetic or chemical storage devices the PMS has to communicate and control the amount and characteristics of the power provided not to overload or damage each of the individual storage systems or control components in the system.

The EV's on board PMS system can also accommodate charging from plug in chargers as well as solar panels which may be part of the EV or external sources. The PMS can also use the different storage systems to optimize the collection of regenerative electric power from wind resistance and from regenerative breaking, wheel breaking and from the car's different electric motors and place them in the appropriate fastest charging storage system. This is most efficient since the amount of power generated by such systems many times exceed the speed at which traditional slow charging EV batteries can be charged and as such the additional power generated is being wasted. The PMS can also direct such power to be used for heating or cooling the EV instead of increasing charge in cases where the storage devices are full or the power can be used more effectively in other systems so no discharge cycles of slow charging batteries takes place.

Unlike other systems proposed in the past such as US Patent Application Publication 2003/0200025 which relies on induction for power transfer and electromechanical storage the proposed system works with relatively greater distances between the transmit and receive coils and with multiple storage subsystems which operate at different voltages, charge cycles and frequencies as well as different types of power which include AC and DC. The proposed system can push up to 500 kWh by utilizing higher frequencies of 100 KHz or more and higher voltages up to 2000 kV at lower amperage and combine resonant active coils with passive coils and shaped ferrite and the unique directional winding of the coil cables to create an optimal Electro Magnetic Field (EMF). The coils may be made out of pure metals, alloys or superconducting materials to optimize the AC to EMF conversion and wave creation and minimize electrical resistance, loss and heat generation.

Inductive power can transfer only 5-10% of its transmission at distances greater than several inches even when high voltage and high frequency is being used but resonant tuned coils can continuously transmit kilowatts and even mega watts of powers at 4-12 feet at an efficiency rate of over 70% and up to 95% efficiency at 1-2 feet. This coil configuration difference and the combination of several different storage systems for each PMS as well as different power levels and formats managed by the PMS provides for substantially shorter charging times and dramatically higher throughput of power transfer and lower loss. Such distances enable to place tuned coils on the bottom or the sides of vehicles and not require perfect alignment and hydraulic or magnetic system to close the distance between the vehicle and the road mounted coils or charging stations. By providing for greater distance EV with normal operation and normal driving conditions as well as normal road conditions can be put to use without danger of damage to the EV or roads and bottom and side clearance which provides for standard and safe use in industry.

The invention provides for alignment and distance management (see FIG. 2) by the use of road mounted guide bumpers as well as electric, pneumatic, electromagnetic or other movable charging pads which contain the transmitting coils or passive coils which can move up and down or change angles to best align with the receiving coils and maximize the transfer rate between the coils. The coils can be mounted on the road, inside the road or on the sided of sidewalks or roads to provide for optimal charge and discharge. Alternatively coils can be mounted above and guided or adjusted if necessary. Multiple coils at different sizes can be placed in each mat and they may be encapsulated in rubber, Teflon, epoxy or other material to provide best protection from the elements or from damage. Such coils can be activated only upon identification and communication between the PMS of the charging station and the EV PMS which can be wireless, RFID, or modulated on top of the power transfer. The PMS may communicate with each other via wired or wireless internet connections as well.

This configuration also does not require costly power installations as any ordinary outlet can be converted into a power charging station. This system and method can also operate very large vehicle that require substantial power for themselves as well as the load they carry such as refrigerated EV trucks or Electrical trains with large batteries and large torque needs.

The usage of any EV can be monitored and recorded via vehicle identification, the PMS identifies the EV and the plan it may be on as well as the power source it may want to use for its charge. With the existing dynamic market for electricity the charging station can provide one EV charge from renewable sources while another EV can be charged from traditional power generation at lower cost. Each EV has identification which initiates the PMS and provides for maintenance and payment information. Some EV vehicles may be on a monthly plan or unlimited plan while others will be charged per KW or for the time they occupy the station or stop. The system may price differently remote station power from congested areas power as well and allow Credit Card and cash payments at the PMS user interface terminal. Payment can also be made via wireless devices which interact with the PMS or the central system which manages such charging stations.

Most EV have varying torque needs based on load on the EV, road condition, temperatures and the start or acceleration of the EV. The PMS is configured to store enough charge in the different systems to optimize availability of such power to the car electrical motor and other systems. For example if the motor is running at 60% of capacity and the car is currently running at 60 miles per hour the PMS may select to empty the super cap charge first and prepare to absorb regenerative charge because there is a low chance the electrical motor will need a high boost in speed or performance under such conditions.

A system and network which incorporates EV charging stations, charging pods, transfer stations and flash charge discharge setup to enable any EV to add charge to their existing super-capacitors and battery charge.

The network includes wire and wirelesss charging pods which recognize the type of battery, super-capacitors and other storage element an EV or mobile device may have and changes the amount of power, speed of charge, voltage and cycles involved to optimize the transfer and retention of such power on the EV side.

Historically EV had to be plugged by cable into special outlets for 6-12 hours a day at home or on the road, which require long stops, cost a lot of money and require special 220 v setup and wiring. These installations are not viable and do not allow consumers to tap into universal low cost electrical power or select green or renewable sources of power for their EV. This invention allows for rapid charging and control by the owner of the EV as to where when and what source of power their EV will use as well as enable access to low cost power that is bought centrally by such inventive system at wholesale rates as described in the co-pending application Ser. No. 12/229,706. The inventive system charging unit PMS can collect power generated from solar panels or other sources and slowly charge its batteries and super caps while it awaits for any compatible electrical vehicles which need a charge. While the charging speed may be slow the conditioned power in the DC batteries and the super caps can be transferred over the coils in both directions at rates over 100 kW so an EV with 100 mile range can be 90% charged in less than 10 minutes.

In addition by adding super-capacitors to the charging stations and to the EV en expedited and optimized charging can take place at much shorter periods of time which allows for more efficient wire or wireless top off and full charging to take place. Such super-capacitors can also be used to help with the vehicle acceleration and bridge the gap between the performance needs of electric motors and the input/output performance of most batteries by adding super-capacitors and many wire and wireless charging stations EV manufacturers can use smaller batteries and cheaper metals and components since their preference limitation are solved by bridging the range and acceleration issues with super-capacitors, high cycle power storage elements and multiple wireless charging locations.

The network includes PMS control devices on both the EV and the charging pod transmit and receive side as well as wireless or radio-frequency (RF) devices which activate and communicate the essential information to the charging station or via the Internet to a central control system to provide authentication, billing and technical data needed to adjust the charging transmission to send or receive electrical power to or from the grid or the charging substation.

Such charging can be done while vehicles are parked, stop for quick rest or food or at an intersection or are in movement at high speeds. Each pod can tune the resonance of the coils to optimize the transmission and transfer of power. One way to eliminate expensive electrical infrastructure and control systems is to add super-capacitors to the charging pods. This addition allows to store over time large amounts of electrical charge at the most appropriate price and time. The PMS system is optimized discharge of large amounts at short time intervals into a control box which includes semiconductor based oscillators which can resonate the coils at the appropriate frequency and voltage to optimize the transfer of the most power from the charging station to the mobile EV.

With such systems in place a new and innovative sales and maintenance package can be offered to any customer that allows manufacturers of EV cars to compete on price with regular gasoline models. By buying any car model without the gasoline engine, gear box and gas tank and retrofitting any such existing car with an electric motor, control box or PMS and installing wireless charging coils as shown in FIG. 1, consumers can buy their favorite car models with a fully electric configuration. Any such car can be offered for sale on a 24-48 month lease with the owner committing to buy all his electricity from the car seller for the period of the lease. By installing solar panels at the buyers home and work location and attaching such panels to charging stations connected to a PMS and the grid the car leases can be further subsidized by the resale of electricity generated or resold from the grid.

Virtual dealerships sell such cars via the web or in show rooms and work with third party installers to setup solar or wind generation facilities and multiple connected charging spots connected to the PMS stations at the buyers home and offices. These can be used by any compatible EV cars for fast charge top offs.

According to an aspect of the invention, the inventive system provides: (1) A charge and discharge system for electrical vehicles comprised of multiple types of electricity storage systems which enables fast transfer, absorption and extraction of electrical charge; (2) Control systems which communicate and arrange the transfer of charge between such different storage systems to maximize the rate of absorption and transfer of electric power but minimize any long term damage to the devises and maximize the life expectancy and number of cycles such systems can manage over time; and (3) A design of an electrical vehicle power storage unit which uses carbon nano tubes configured as a container and which holds other types of storage units and act as a super capacitor connected to such other storage units.

According to another aspect of the invention, the system provides: (1) Electric motor, Power Controller, Super capacitors, coils and storage batteries configured so they can fit and be used in many production gasoline vehicles to retrofit such cars to be electric vehicles with wireless charging; (2) A charging station which is configured to receive power from the grid and from solar panels and can store some of such power to speed up the charging of more than one electrical vehicles; further such charging station can direct power collected via solar panels back to the grid or to the storage vehicle based on market prices it obtains wirelessly or via the internet.

According to an embodiment, the system comprises: electrical vehicle, financial leasing, charging station connected to multiple power sources and an electric power resale license combined to offer buyers of electrical vehicles lease prices that are lower than equivalent gasoline cars by subsidizing the price of the lease with profits generated from the resale of the electricity.

DETAILED DESCRIPTION OF THE PRESENTLY PREFERRED EMBODIMENTS

Figure 1:
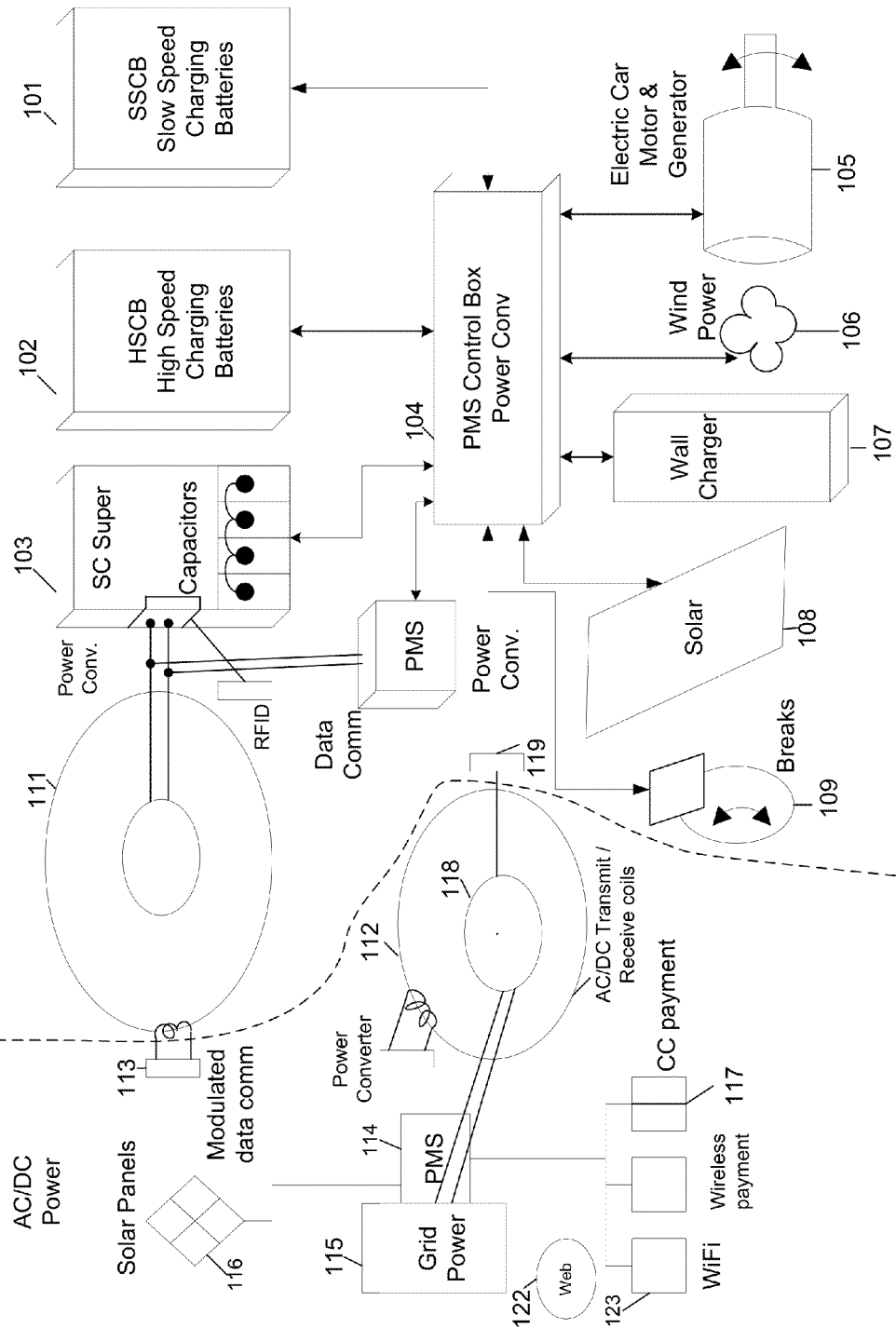
FIG. 1 depicts the charging unit components and system, the car apparatus components and system and how they interact with each other to transfer and store electric energy.

FIG. 1 illustrates the charging unit 120 and the car apparatus 121 and how they interact with each other to provide ultra fast charging and top off services. The PMS 114 is connected to grid power 115 and other power sources such as solar panels 116 and coil 112 and 118 as well as wireless sensors 117 and the web 122. The charging unit 120 can communicate with car 121 via coils 112 and 118 or via wireless connection 123 or via internet 122 or other wireless device.

The electric power is conditioned and collected by the PMS 114 from all sources and is stored in super caps and batteries connected to PMS 114 so it could be discharged at a very high rate that is much higher than the transfer rate the grid or other power sources can deliver. When a car aligns its receiving coil 111 and signals to the PMS the amount of time, power and type of systems it has on board the PMS 114 calculates the optimal configuration and a transfer takes place and the power is directed by the PMS 114 from the storage devices or power sources connected to PMS 114 to the coils 118 and 112 to create EMF which is then absorbed and translated back into electricity on coil 111. Such power is monitored and managed continually by PMS 110, 114 and 104 and is directed to SC 103 and then to HSCB 102 and slow-speed charging batteries (SSCB) 101 based on the duration of the charge and the level of power in each unit. Coil 111 may also transmit or receive data communications over the same EMF link which can be detected and separated from the power transfer by specialized devices 113. Alternatively communications can be initiated via Near-Field-communication (NFC) or radio-frequency identification (RFID) technologies via devices 119. The car configuration 121 also permits rapid absorption of power generated from braking 109, solar 108, wired wall charges 107 or via the car electric motor 105. Based on the level of power the PMS 104 conditions and directs the power to the appropriate storage system 103,102,101 or 114 to store the most power and limit any losses.

Figure 2:
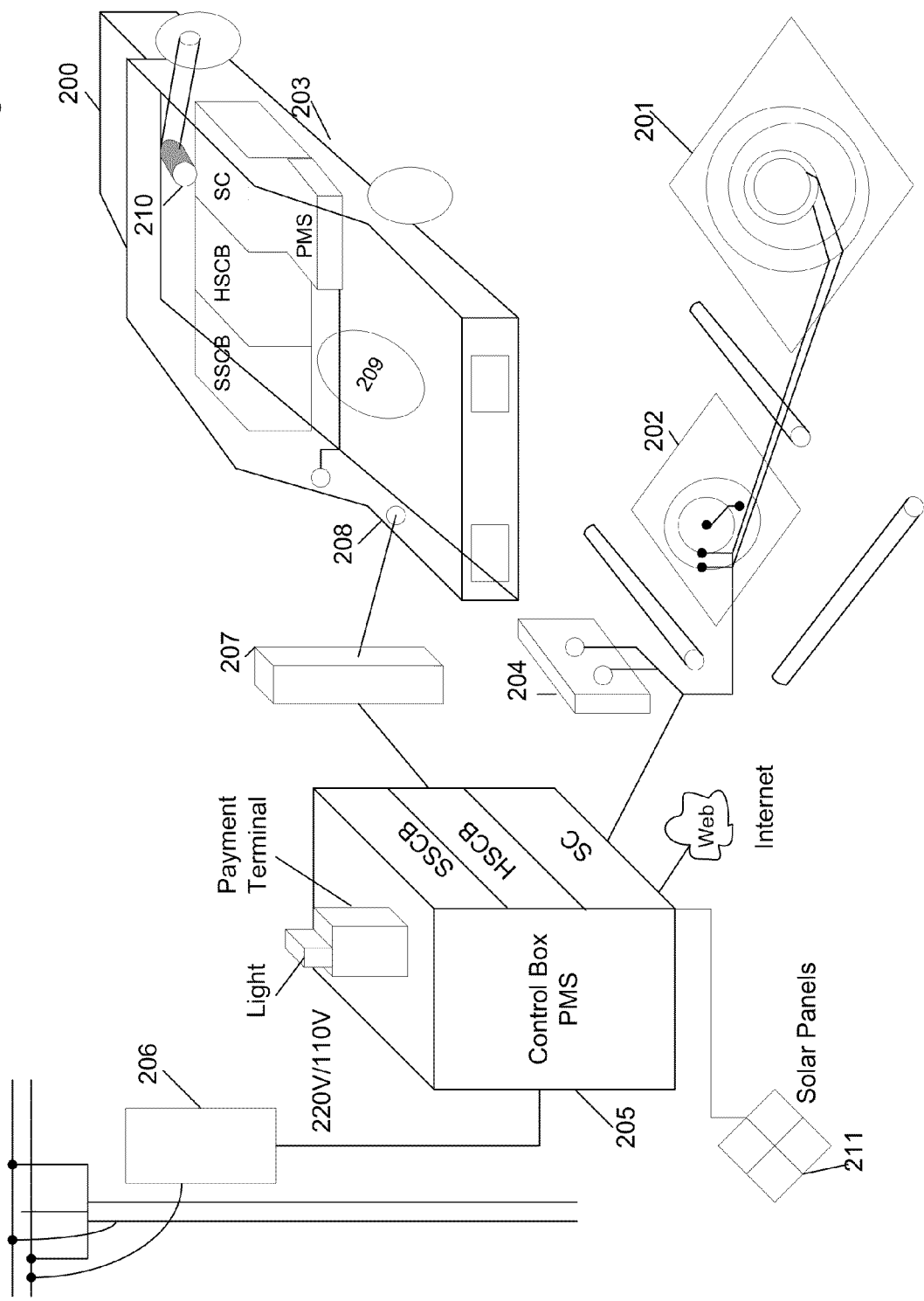
FIG. 2 illustrates how electrical vehicles may interact and position with such systems.

FIG. 2 describes the charging system 205 and how it works with multiple charging spots and devices. The PMS 205 can initiate and send or receive power from car 200 via charger 207 or wireless connections 201, 202 or 204. Such power can be moved to local storage in 205 or directed back to the grid 206, alternatively power generated by solar panels 2011 or other source can be conditioned, stored and then directed to the grid or car 200 based on prices or communications from the internet or wireless networks. The car 200 which has been retrofitted with electrical engine 210 instead of gasoline engine, coil 209 and PMS system 203 which include storage sub systems SC 203, HSCB 203 and SSCP 203 and SSCB which mirror the capacity and characteristics of PMS 205. Such configuration enables rapid top off and communications to take place while driving or with short stops. Systems 201, 202 and 204 are designed to optimize the EMF resonant link by using multiple active and passive coils in 201 and by narrowing the distance to the car receiving coil 209 by coil system 202 or by having such transmission be on the side or on top of the vehicle as shown in 204, which will align with receiving coil 208. Such configurations can be used to minimize the alterations that are necessary so a production gasoline cars as well as EV's can be retrofitted to be full range electric vehicle.

Different type of batteries and capacitors can be combined into structures such as 203 to provide better protection for the encasement and safety of the entire storage solution. For example, the outside of the battery 203 may be made of nano tubes and configured to act as a super capacitor and take advantage of the strength of the nano material casing to contain many smaller batteries such as HSCB and SSCB made of more volatile materials such as Lithium.

Figure 3:
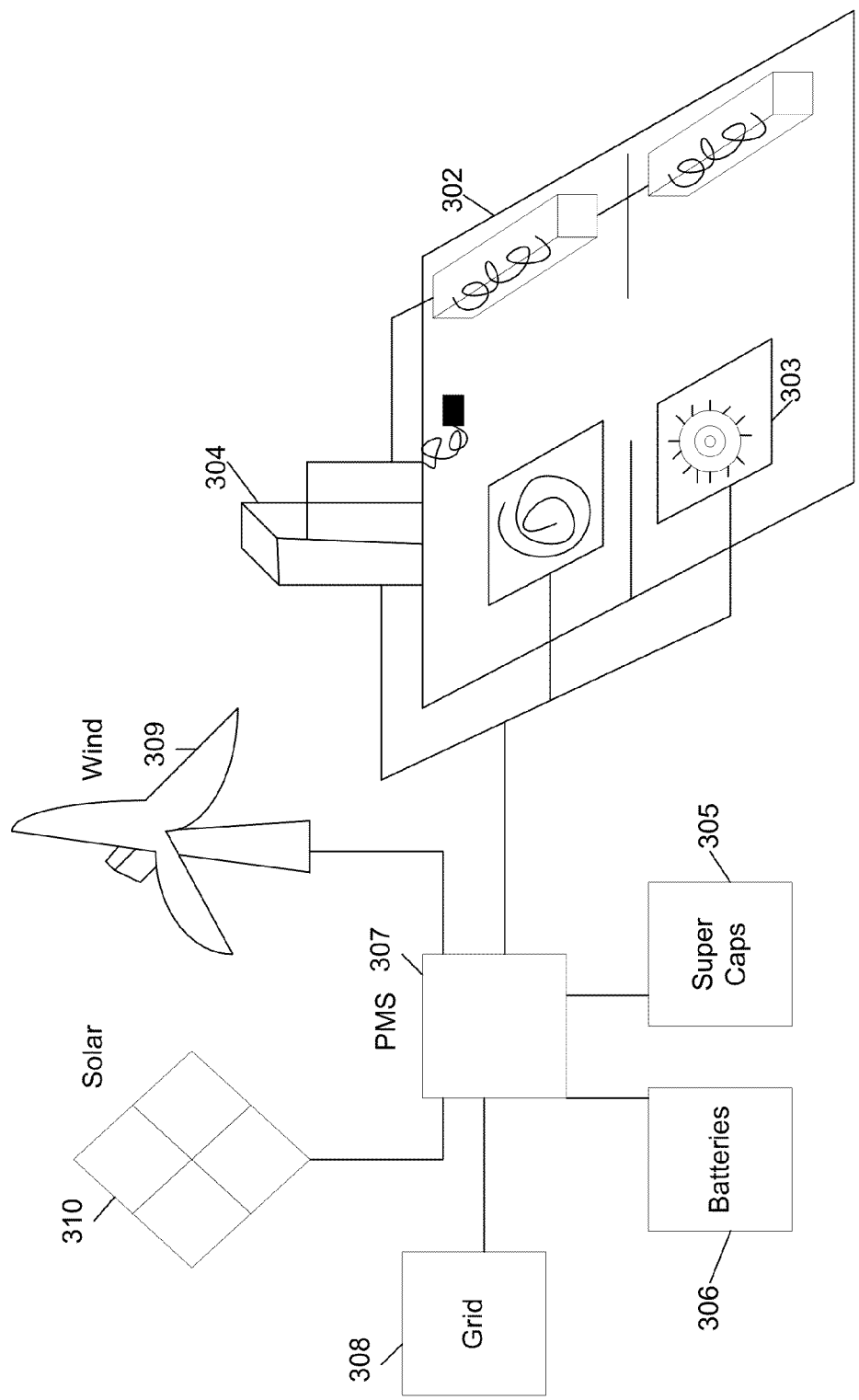
FIG. 3 shows a charging unit configuration and its components.

FIG. 3 illustrates a configuration of a charging station and PMS 307, how it is connected to power sources 309, 310 and 308 and how it manages the collection and distribution of such power via charging cable 304, pads 303 and devices 302. This illustration describes a configuration applicable to urban areas where a shared charging station with accompanying power sources can be provided for multiple EV vehicles or for passing cars so they can be charged in motion, or over short and long stops.

Such configuration can be designed to be placed inside buildings or at strategic locations around the electric grid to provide safe and fire code compliant access to store and retrieve power for a variety of purposes.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An electric vehicle charging system, comprising:
   a secondary resonant coil operatively connected to an electric vehicle, which is tuned to have a resonant frequency that is substantially the same as a resonant frequency of a primary resonant coil located outside the electric vehicle, wherein the primary resonant coil is operatively connected to a source of electrical power and the secondary resonant coil is wirelessly coupled to the primary resonant coil to receive the electric power from the primary resonant coil; and
   a power management system (PMS) that is configured to receive the electric power from the secondary resonant coil, the PMS including a processor, a software module controllably coupled to the processor, a super capacitor (SC), a high speed charging battery (HSCB) and a slow speed charging battery (SSCB);
   wherein the software module includes:
      a first set of instructions that instruct the PMS to control a first power transfer rate used to transfer at least a portion of the electric power to a first charge stored on the super capacitor;
      a second set of instructions that instruct the PMS to control a second power transfer rate used to transfer at least a portion of the electric power to a second charge stored on the HSCB; and
      a third set of instructions that instruct the PMS to control a third power transfer rate used to transfer at least a portion of the electric power to a third charge stored on the SSBC.

2. The electric vehicle charging system of claim 1, wherein the software module, when executed by the processor, further causes the PMS to:
   perform measurement and dynamic tuning of a parameter associated with the electric power.

3. The electric vehicle charging system of claim 2, wherein the parameter corresponds to an electric voltage.

4. The electric vehicle charging system of claim 2, wherein the parameter corresponds to amperage of electric current.

5. The electric vehicle charging system of claim 2, wherein the parameter corresponds to a cycle rate.

6. The electric vehicle charging system of claim 1, wherein the dynamic tuning is performed based upon an overall charge level that includes components from the first charge, the second charge and the third charge.

7. The electric vehicle charging system of claim 1, wherein the dynamic tuning is performed based upon at least one charge transfer rate.

8. The electric vehicle charging system of claim 1, wherein the dynamic tuning is performed based upon a distance between the primary resonant coil and the secondary resonant coil.

9. The electric vehicle charging system of claim 1, wherein the software module, when executed by the processor, further causes the PMS to:
   discharge into a load at least a portion of at least one of the first charge, the second charge and the third charge based on at least one characteristic of at least one of the SC, the HSCB and the SSCB.

10. The electric vehicle charging system of claim 1, wherein the software module, when executed by the processor, further causes the PMS to:
    regulate a first rate of transfer of charge from the secondary resonant coil to the SC.

11. The electric vehicle charging system of claim 10, wherein the software module, when executed by the processor, further causes the PMS to:
    regulate a second rate of transfer of charge from the SC to the HSCB.

12. The electric vehicle charging system of claim 11, wherein the software module, when executed by the processor, further causes the PMS to:
    regulate a third rate of transfer of charge from the HSCB to the SSCB.

13. The electric vehicle charging system of claim 12, wherein the first, second and third rates of transfer of charge are performed to cause a larger amount of the electric power to be transferred in a fixed amount of time from the primary resonant coil into electric charge to be stored in the SSCB than would be possible by transferring the electric power directly from the primary resonant coil to the SSCB.

14. The electric vehicle charging system of claim 1, wherein the secondary resonant coil is configured using ferrite and movable physical elements to create directional electric and magnetic fields (EMF) to optimize the reception of the EMF based an allowable time for a transfer of electric power to occur from the primary resonant coil to the secondary resonant coil.

15. The electric vehicle charging system of claim 1, wherein the secondary resonant coil is configured using ferrite and movable physical elements to create directional electric and magnetic fields (EMF) to optimize the reception of the EMF based a road condition at the time of transfer.

16. The electric vehicle charging system of claim 1, wherein the secondary resonant coil is configured using ferrite and movable physical elements to create directional electric and magnetic fields (EMF) to optimize the reception of the EMF based a distance between the primary and secondary resonant coils at the time of transfer.

17. The electric vehicle charging system of claim 1, wherein the PMS manages an overall charging cycle of the electric vehicle charging system.

18. The electric vehicle charging system of claim 1, wherein the software module, when executed by the processor, further causes the PMS to:
wirelessly communicate control information to a charging station PMS that is associated with the primary resonant coil.

19. The electric vehicle charging system of claim 18, wherein the control information causes the charging station PMS to increase a fourth power transfer rate used to transfer the electric power into the primary resonant coil for subsequent transfer via the wireless coupling of the electric power from the primary resonant coil to the secondary resonant coil.

20. The electric vehicle charging system of claim 18, wherein the control information causes the charging station PMS to decrease a fourth power transfer rate used to transfer the electric power into the primary resonant coil for subsequent transfer via the wireless coupling of the electric power from the primary resonant coil to the secondary resonant coil.

21. The electric vehicle charging system of claim 18, wherein the control information causes the charging station PMS to start transferring the electric power into the primary resonant coil for subsequent transfer via the wireless coupling from the primary resonant coil to the secondary resonant coil.

22. The electric vehicle charging system of claim 18, wherein the control information causes the charging station PMS to stop transferring the electric power into the primary resonant coil for subsequent transfer via the wireless coupling from the primary resonant coil to the secondary resonant coil.

23. The electric vehicle charging system of claim 18, wherein the control information is provided to based upon at least one measured power transfer rate.

24. The electric vehicle charging system of claim 18, wherein the control information is provided to based upon at least one measured power absorption rate.

25. The electric vehicle charging system of claim 24, wherein the at least one measured power absorption rate relates to a rate of power absorption by the SC.

26. The electric vehicle charging system of claim 24, wherein the at least one measured power absorption rate relates to a rate of power absorption by the HSCB.

27. The electric vehicle charging system of claim 24, wherein the at least one measured power absorption rate relates to a rate of power absorption by the SSCB.

* * * * *